A. A. CAPELING.
DUST-GUARDS FOR SEWING-MACHINES.

No. 187,097. Patented Feb. 6, 1877.

Witnesses.
Wallace Fiske
P. J. Cogswell

Inventor.
A. A. Capeling
By Wm. S. Loughborough
Atty

UNITED STATES PATENT OFFICE.

ALBERT A. CAPELING, OF ROCHESTER, NEW YORK.

IMPROVEMENT IN DUST-GUARDS FOR SEWING-MACHINES.

Specification forming part of Letters Patent No. 187,097, dated February 6, 1877; application filed September 15, 1876.

*To all whom it may concern:*

Be it known that I, ALBERT A. CAPELING, of Rochester, in the county of Monroe and State of New York, have invented a new and useful Improvement in Dust-Guards for Sewing-Machines; and I do hereby declare that the following is a full, clear, and exact description of the same.

My invention consists in an improved guard, cover, or case for the works of sewing-machines, more especially for the Howe, Weed, and other machines, having the stitch-regulator located underneath the table.

Figure 1:
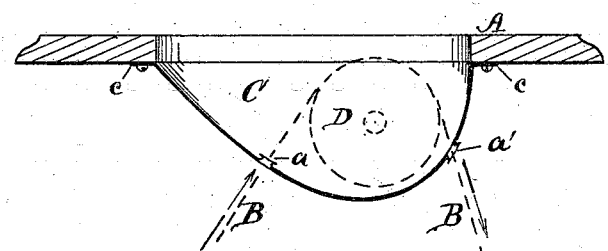
Figure 2:
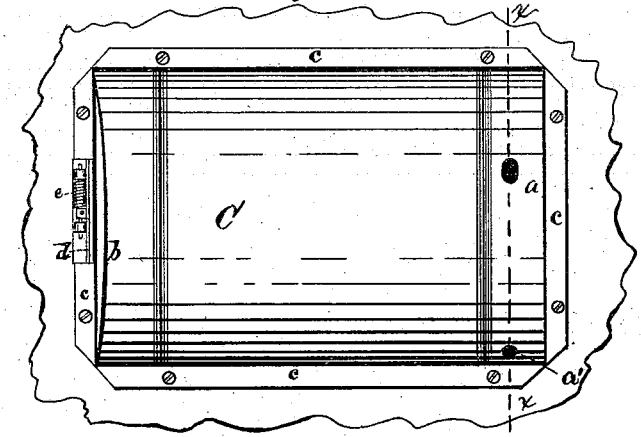
Figure 3:
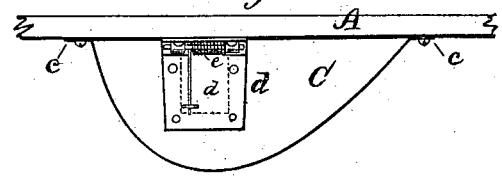

In the accompanying drawing, forming part of this specification, Figure 1 is a cross-section, on line $x$ $x$, Fig. 2, of a table and my improved guard or case for protecting the works. Fig. 2 is a reverse plan view. Fig. 3 is an end view.

The guard or case C is constructed of sheet metal, preferably tin, and is approximately in the form of a hollow half-cylinder with closed ends. A narrow horizontal flange, $c$, extends around the edge, through which screws or nails are inserted to attach the guard to the under side of the table A. The guard is provided at one end with an opening, (shown in dotted lines, Fig. 3,) to permit access to the stitch lengthener or regulator. A drop or door, $d$, is attached to the guard C to cover the said opening, and provided with a spring, $e$, by which it is rendered self-closing. The hinge of the drop is riveted to the flange $c$, so that the drop forms a permanent attachment, or, so to speak, an integral portion of the guard. To adapt the guard for machines, such as the Elias Howe, in which the upper pulley requires to be inclosed by it, holes $a$ $a'$ are necessarily provided for the band B. These holes are punched out and the metal swaged, thus forming a circular flange, which projects inward at $a$ and outward at $a'$, so that the band B is not liable to be cut or abraded when placing it on the pulley. The holes $a$ $a'$ serve the purpose of a band-retainer, holding it up and in position to be easily replaced on the pulley.

For the purpose of forming a close joint, to exclude dust and prevent rattling by contact of metallic surfaces when the machine is running, I apply a packing of felt or leather to the inner side of the drop $d$ and to the upper side of the flange $c$.

The advantage of a guard for protecting the works of a sewing-machine from dust, and preventing the oil applied to the friction-surfaces from drying rapidly, and thus enabling the machine to be run several weeks without requiring oiling or cleaning, has been fully demonstrated. I do not, therefore, claim, broadly, the employment of a guard; but

What I claim as my invention is—

The sheet-metal guard C, having the flange $c$, and an aperture provided with the spring-hinged self-closing door, as shown and described, for the purpose specified.

ALBERT A. CAPELING.

Witnesses:
 WM. S. LOUGHBOROUGH,
 A. L. MABBETT.